United States Patent
Matsuo et al.

(10) Patent No.: US 9,370,173 B2
(45) Date of Patent: Jun. 21, 2016

(54) SPINNING REEL

(71) Applicant: Shimano Inc., Sakai, Osaka (JP)

(72) Inventors: Shingo Matsuo, Osaka (JP); Hirokazu Hiraoka, Osaka (JP); Keigo Kitajima, Osaka (JP)

(73) Assignee: Shimano Inc., Osaka (JP)

( * ) Notice: Subject to any disclaimer, the term of this patent is extended or adjusted under 35 U.S.C. 154(b) by 78 days.

(21) Appl. No.: 14/451,211

(22) Filed: Aug. 4, 2014

(65) Prior Publication Data

US 2015/0048192 A1 Feb. 19, 2015

(30) Foreign Application Priority Data

Aug. 16, 2013 (JP) ................................ 2013-169119

(51) Int. Cl.
*A01K 89/01* (2006.01)
(52) U.S. Cl.
CPC .................................. *A01K 89/0114* (2013.01)
(58) Field of Classification Search
CPC ........... A01K 89/01; A01K 89/011221; A01K 89/011223; A01K 89/01143; A01K 89/01916; A01K 89/01912; A01K 89/01917
See application file for complete search history.

(56) References Cited

U.S. PATENT DOCUMENTS

| | | | |
|---|---|---|---|
| 5,350,130 A | 9/1994 | Hitomi et al. | |
| 2003/0047633 A1* | 3/2003 | Kitajima | A01K 89/0114 242/278 |
| 2003/0111569 A1* | 6/2003 | Hitomi | A01K 89/00 242/321 |
| 2007/0057105 A1* | 3/2007 | Kitajima | A01K 89/0114 242/241 |
| 2010/0187346 A1* | 7/2010 | Ochiai | A01K 89/0114 242/242 |

FOREIGN PATENT DOCUMENTS

| | | |
|---|---|---|
| EP | 2 036 431 A1 | 3/2009 |
| JP | 2004-261077 A | 9/2004 |
| JP | 2004-267035 A | 9/2004 |
| JP | 2005-245252 A | 9/2005 |
| JP | 2007-252324 A | 10/2007 |

OTHER PUBLICATIONS

European Search Report of corresponding EP Application No. 14 18 0610.9 dated Feb. 2, 2015.

* cited by examiner

*Primary Examiner* — Emmanuel M Marcelo
(74) *Attorney, Agent, or Firm* — Global IP Counselors

(57) ABSTRACT

A spinning reel includes a reel body, a handle, a spool shaft, a spool, a rotor, a rotor driving mechanism, and an oscillating mechanism configured to rotate in conjunction with the handle and cause the spool to reciprocate via the spool shaft. The oscillating mechanism includes a threaded shaft having a spiral groove and is configured to rotate in conjunction with the rotation of the handle. A slider is engaged with the spiral groove of the threaded shaft, and is configured to reciprocate in conjunction with rotation of the threaded shaft. A guide shaft has a rear end disposed in the through-hole arranged in the rear portion of the reel body, and is locked so as to prevent the shaft from disconnecting from by the reel body, and is configured to guide the reciprocation of the slider. An annular elastic member is disposed between the through-hole and the guide shaft.

8 Claims, 6 Drawing Sheets

SPINNING REEL

CROSS-REFERENCE TO RELATED APPLICATIONS

This application claims priority to Japanese Patent Application No. 2013-169119, filed on Aug. 16, 2013. The entire disclosure of Japanese Patent Application No. 2013-169119 is hereby incorporated herein by reference.

BACKGROUND

1. Field of Invention

The present invention relates to a spinning reel. In particular, the present invention relates to a spinning reel having an oscillating mechanism for moving the spool back and forth.

2. Background Information

Conventional oscillating mechanisms reciprocate based on the rotation of the handle so as to drive the spool of a reel back and forth. That is, oscillating mechanisms can have a threaded shaft that rotates in conjunction with the rotation of the handle, a slider that makes a reciprocal movement back and forth as the threaded shaft rotates, and a guide shaft that guides the reciprocating movement of the slider (for example, see Japanese Laid Open Patent Application No. Hei 2005-245252). The spinning reel of Japanese Laid Open Patent Application No. Hei 2005-245252 relates to a technical scheme for tolerating error and eliminating the backlash in the radial direction between the slider and the guide shaft caused by the parallel error between the slider and the guide shaft and the dimensional error between the slider and the guide shaft. More specifically, a through-hole larger in diameter than the guide shaft is arranged on the slider or the reel body, and an elastic member energized in the radial direction of the guide shaft is arranged in between the through-hole and the guide shaft. As a result, suppressing the backlash in the radial direction caused by this error is possible. Also, the guide shaft is locked by a body cover that forms the reel body to prevent the shaft from disconnecting from by the reel body.

SUMMARY

For the conventional spinning reel, the guide shaft is inserted in the axial direction, and pulling the guide shaft out is prevented by the reel body. Consequently, due to the error of attachment in the axial direction between the guide shaft and the reel body, a gap is formed in the axial direction between the reel body and the guide shaft. As a gap is formed, the guide shaft backlashes against the reel body in the axial direction, generating noise due to the repeated backlash.

The purpose of the invention is to provide a spinning reel that can prevent the generation of noise due to the backlash in the axial direction of the guide shaft.

The spinning reel related to the present invention is a reel that can forwardly release a fishing line. The spinning reel comprises a reel body, a spool shaft, a spool, a rotor, a rotor driving mechanism, and an oscillating mechanism. The reel body has a handle for winding up the fishing line and is rotatable. The spool shaft is disposed so as to be able to move in the longitudinal direction on the reel body. The spool is arranged on the front end portion of the spool shaft and has the fishing line wound on the outer periphery thereof. The rotor is arranged so as to be rotatable on the outer peripheral side of the spool and winds fishing line on the spool due to the rotation of the handle. The rotor driving mechanism transmits the rotation of the handle to the rotor and, in conjunction with the rotation of the handle, rotates the rotor. The oscillating mechanism is moved in conjunction with the rotation of the handle to drive the spool to reciprocally move back and forth. The oscillating mechanism comprises a threaded shaft, a slider, a guide shaft, and an annular elastic member. The threaded shaft has a spiral groove crossing the outer peripheral portion formed on the shaft and is rotated in conjunction with the rotation of the handle. The slider is connected to the spool shaft so that they can move as an integrated body in the axial direction. The slider is engaged with the spiral groove of the threaded shaft and reciprocates (i.e., moves back-and-forth) in conjunction with the rotation of the threaded shaft. The rear end of the guide shaft is rear end supported by the through-hole arranged on the rear portion of the reel body and is locked in order to be prevented from disconnecting from the reel body while guiding the reciprocating movement of the slider. The annular elastic member is arranged between the through-hole and the guide shaft.

For this spinning reel, when the handle is rotated, the threaded shaft rotates so that the slider reciprocally moves back and forth and so that the spool reciprocally moves back and forth. The slider is guided by the guide shaft in the longitudinal direction. The guide shaft is installed via the through-hole on the reel body and has the rear end supported by the reel body. The guide shaft is prevented from disconnecting by the reel body after being installed on the reel body. An annular elastic member is arranged between the through-hole and the guide shaft. This annular elastic member works to limit the movement of the guide shaft in the longitudinal direction (the axial direction). In addition, the annular elastic member can prevent contact between the guide shaft and the through-hole. Here, by arranging the annular elastic member between the guide shaft and the through-hole, limiting the movement of the guide shaft in the axial direction and in the radial direction is possible. Consequently, suppressing the backlash in the axial direction of the guide shaft is possible, and preventing the generation of noise by the backlash in the axial direction is possible. In addition, by arranging the annular elastic member between the through-hole and the guide shaft, sealing off the gap between the through-hole and the guide shaft is possible, so that preventing dust, liquid or other foreign objects from entering the gap between the through-hole and the guide shaft is possible.

The elastic member may also have a holding groove for holding the elastic member on the outer peripheral surface. In this case, as the elastic member is held in the annular groove, moving the guide shaft in the axial direction becomes even more difficult.

The elastic member may be an O-ring made of a rubber. In this case, using a commercially available O-ring with a round cross section or an O-ring with a non-round cross-section, prevention of the generation of noise is simple.

The elastic member may be an O-ring having an annular recession on the rear side and having a nearly C-shaped cross section. In this case, measurement of the weight of the elastic member is possible; at the same time, with the annular recession arranged on the rear side, more reliable prevention of entry of foreign objects is possible.

The through-hole has a large diameter section, a small diameter section and a stepped section for connecting the large diameter section and the small diameter section. The elastic member may also be set between the large diameter section and the guide shaft. In this case, because the gap between the guide shaft and the through-hole (the small diameter section is smaller, minimizing the backlash of the guide shaft in the radial direction is possible.

The elastic member may also come in contact with the large diameter section, the small diameter section and the guide shaft, respectively. In this case, as the elastic member is in contact with the step section, the elastic member can be positioned in the axial direction, on that further suppression of the backlash of the guide shaft in the axial direction is possible. Also, dust, liquid or other foreign objects will be further prevented from entering the spinning reel through the gap between the through-hole and the guide shaft.

The reel body may also have a pressing plate that holds at least a portion of the rear end portion of the guide shaft. In this configuration, the pressing plate prevents the guide shaft from disconnecting from the reel body, even though the guide shaft barely contacts the pressing plate, enabling suppression of noise even when the pressing plate is arranged on the reel body.

The reel body may also have a body guard that covers the rear end portion of the guide shaft and the pressing plate. In this configuration, since the pressing plate and the rear end portion of the guide shaft are covered with the body guard, the appearance of the spinning reel is improved.

According to the present invention, by arranging an annular elastic member between the guide shaft and the through-hole, limiting the movement of the guide shaft in the axial direction and in the radial direction is possible. Consequently, suppressing the backlash of the guide shaft in the axial direction is possible, and preventing the generation of noise due to the backlash in the axial direction is possible.

BRIEF DESCRIPTIONS OF THE DRAWINGS

DETAILED DESCRIPTION OF EMBODIMENTS

Figure 1:
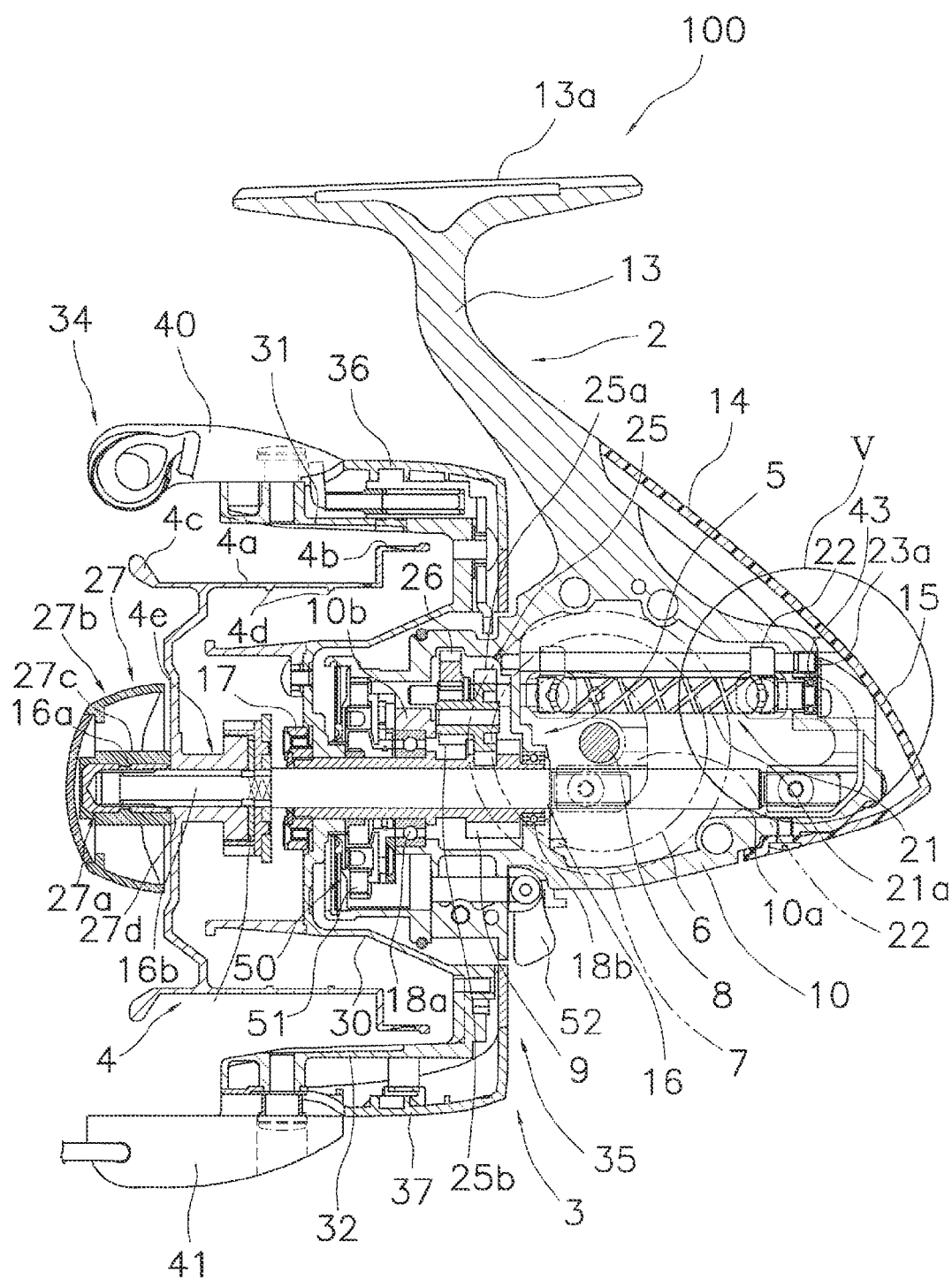
FIG. 1 is a side cross-sectional view illustrating a spinning reel according to an embodiment of the present invention.
Figure 2:
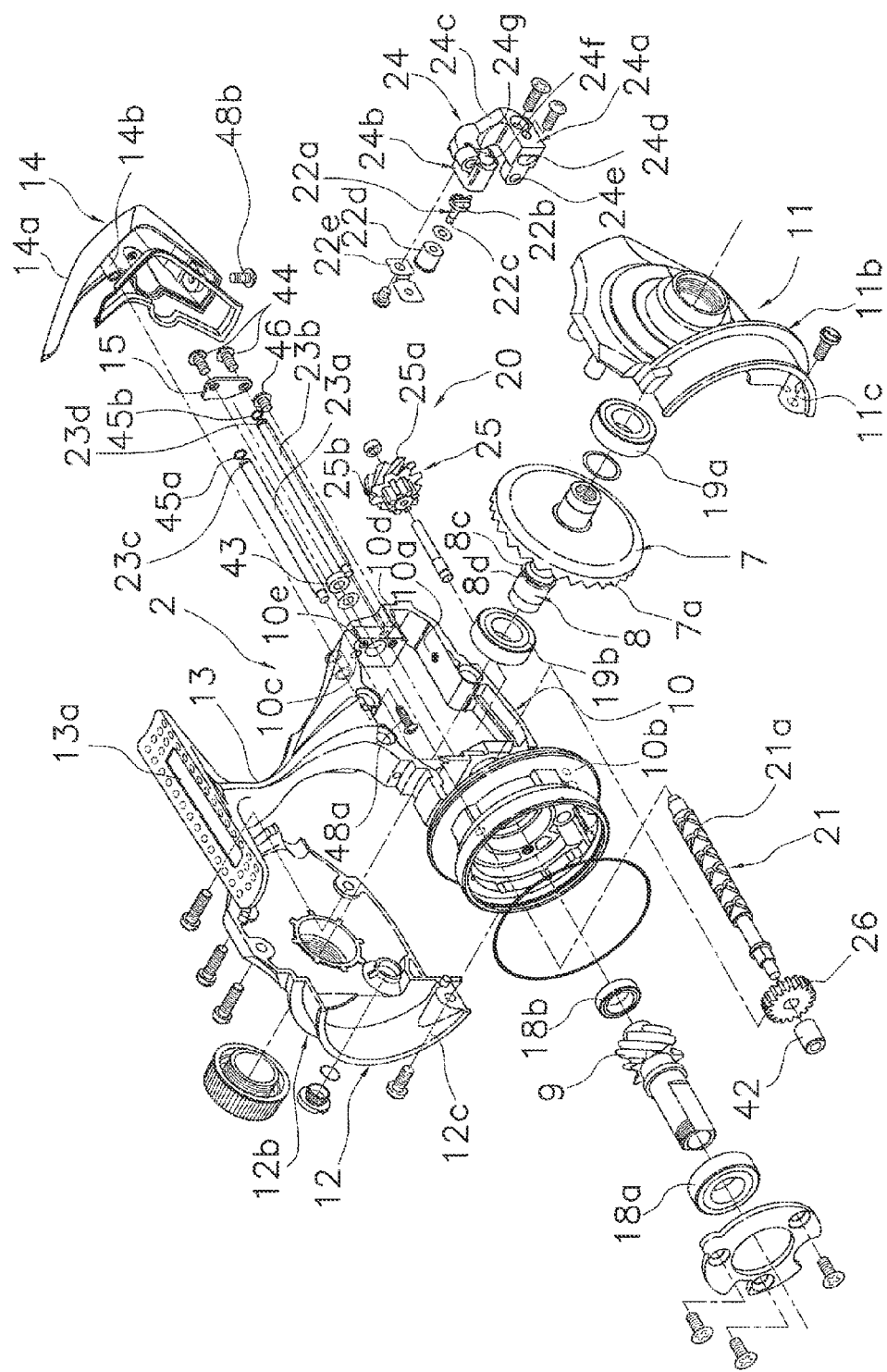
FIG. 2 is an exploded perspective view illustrating the spinning reel of FIG. 1.
Figure 3:
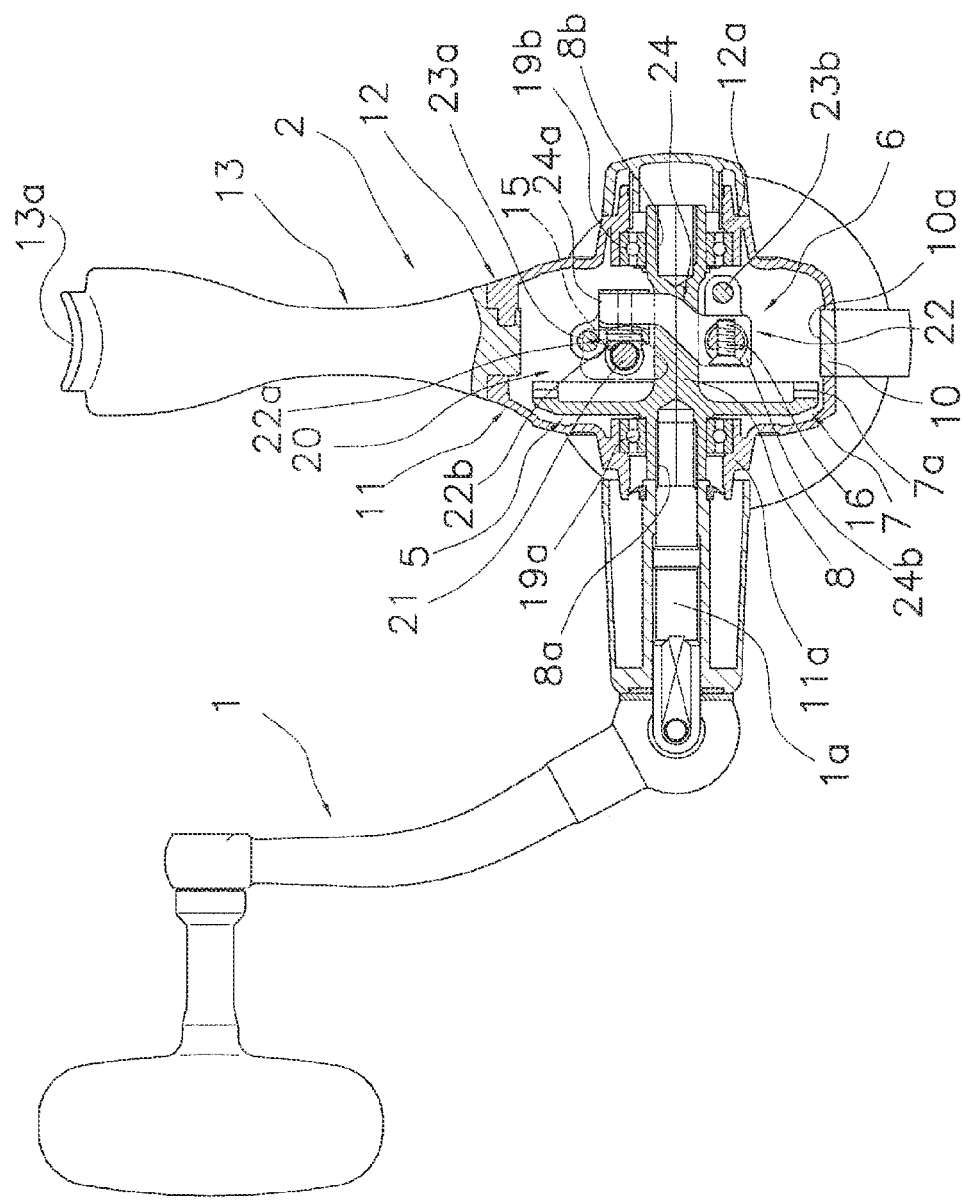
FIG. 3 is a rear cross-sectional view of the spinning reel of FIG. 1.

As shown in FIGS. 1, 2 and 3, the spinning reel 100 in an embodiment of the present invention has a handle 1, a reel body 2 configured to be installed on or attached to a fishing rod, a rotor 3 rotatably disposed on the front portion of the reel body 2, and a spool 4 that is capable of reciprocating back and forth arranged on the front portion of the rotor 3. Also, the spinning reel 100 has a rotor driving mechanism 5 that drives the rotor 3 to rotate in conjunction with rotation of the handle 1 and an oscillating mechanism 6 that drives the spool 4 back and forth in conjunction with the rotation of the handle 1. Here, back and forth refers to the reciprocation along the longitudinal direction of the spinning reel, so as to release the fishing line in the front or forward direction, and the opposite direction of the front direction is the back or rear direction. Also, the left/right refers to the left/right directions as the spinning reel 100 is viewed from the rear side.

As shown in detail in FIGS. 2 and 3, the reel body 2 has a rotor driving mechanism 5 and the oscillating mechanism 6 accommodated inside of the reel body 2. The reel body 2 comprises a case section 10 with both sides opened, a first lid member 11 and a second lid member 12 that block the two sides of the case section 10, respectively, a rod attaching leg section 13 integrally formed with the case section 10, a body guard 14 that covers the rear side the case section 10, the first lid member 11 and the second lid member 12, and a pressing plate 15.

Figure 5:
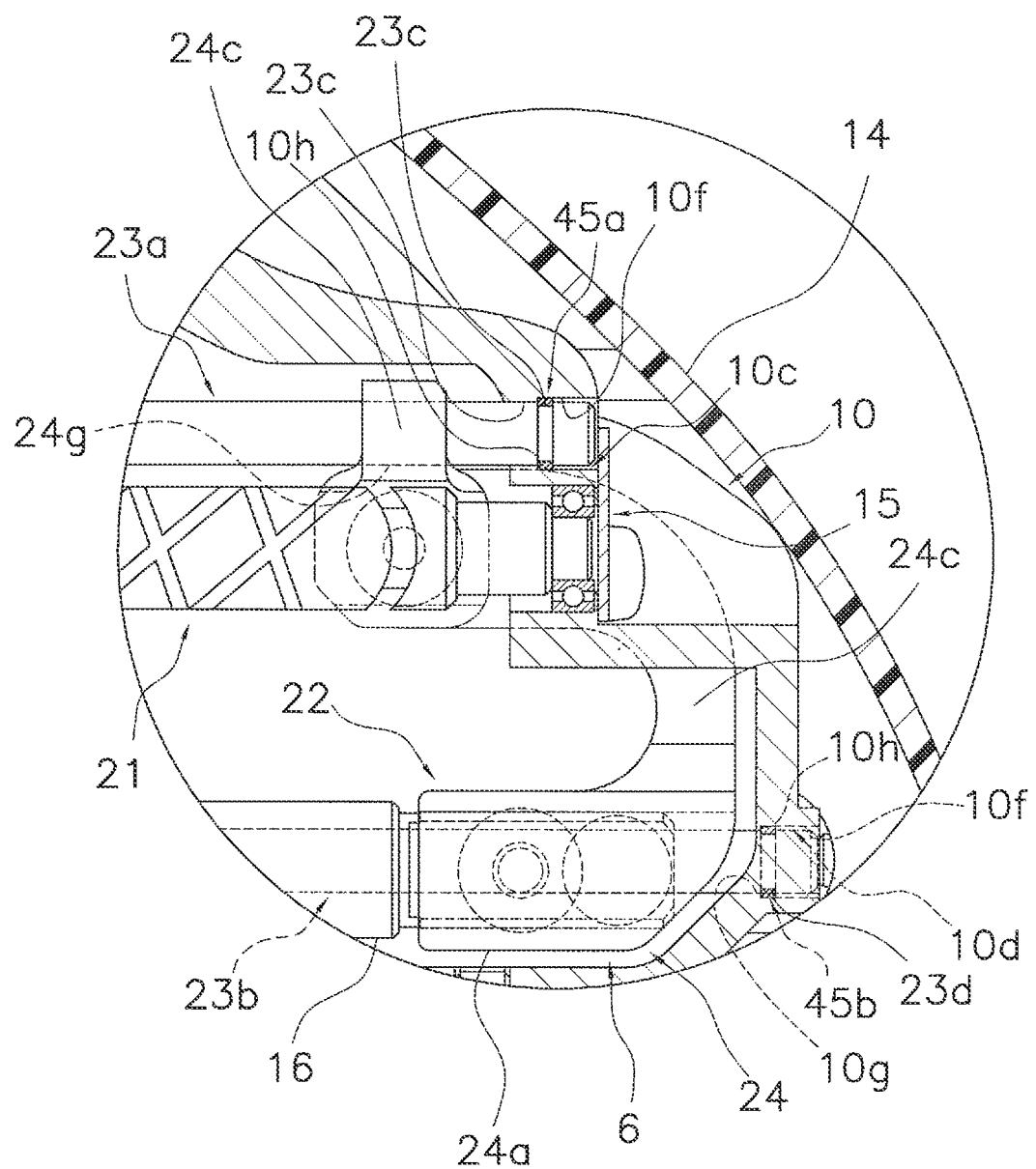
FIG. 5 is an enlarged view of the V portion in FIG. 1.

The case section 10 is made of for example, an aluminum alloy and is a frame-shaped. member with both sides opened to form an accommodating space 10a for accommodating and supporting the rotor driving mechanism 5 and the oscillating mechanism 6. A disk-shaped mechanism supporting section 10b for installing the one-way clutch 51 of a reverse rotation prohibiting mechanism 50, to be explained later, as well as a pinion gear 9, etc. is formed on the front side of the case section 10. As shown in FIGS. 2 and 5, on the rear portion of the case section 10, a first through-hole 10c, a second through-hole 10d and a third through-hole 10e are formed along the longitudinal direction for installing the first guide shaft 23a and the second guide shaft 23b, to be explained later, of the oscillating mechanism 6 and the bearing 43 that supports the threaded shah 21, respectively. The first through-hole 10c and the second through-hole 10d are an example of the through-holes arranged on the rear section of the reel body 2.

As shown in FIG. 5, an enlarged view, both the first through-hole 10c and the second through-hole 10d have a large diameter section 10f, a small diameter section 10g with diameter smaller than that of the large diameter section 10f, and a step section 10h that connects the large diameter section 10f and the small diameter section 10g. Here, the small diameter section 10g is a hole with a diameter equal to or a little larger than that of the first guide shaft 23a and the second guide shaft 23b, and this section is arranged for supporting the first guide shaft 23a and the second guide shaft 23b. The large diameter section 10f is arranged so as to install the first elastic member 45a and the second elastic member 45b. The first elastic member 45a (or the second elastic member 45b) is arranged between the large diameter section 10f and the first guide shaft 23a (or the second guide shaft 23b).

The first lid member 11 is made of for example, an aluminum alloy, and is formed to cover a side of the case section 10. The first lid member 11 is arranged near the driving gear 7 of the rotor driving mechanism 5. As shown in FIG. 3, the first lid member 11 has a first boss section 11a that supports one end of the driving gear shaft 8 where the driving gear 7 is arranged on the back side of the driving gear 7. The first boss section 11a is formed protruding outward on nearly the central portion of the wall surface of the first lid member 11. Also, as shown in FIG. 2, for the first lid member 11, the front portion has a first flange section 11b formed nearly in a semicircular shape that forms a disk portion entering the interior of the rotor 3. In addition, in the front portion of the first lid member 11, a first mechanism accommodating cover is arranged on the rear surface of the mechanism supporting section 10b in nearly a semicircular shape and formed substantially or generally flush with the outer peripheral surface of the mechanism supporting section 10b.

The second lid member 12 is made of, for example, an aluminum alloy, and has a symmetrical mirror image relationship with the first lid member 11. As shown in FIGS. 2 and 3, the second lid member 12 has a second boss section 12a, a second flange section 12b and a second mechanism accommodating cover 12c formed to have symmetrical mirror image relationship with the first boss section 11a, the first flange section 11b and the first mechanism accommodating cover 11c, respectively. Consequently, the first flange section 11b and the second flange section 12b form a round shape with the outer peripheral surface of the rear end surface of the mechanism supporting section 10b of the case section 10.

This round-shaped portion is formed to be able to fit into the small gap on the rear surface of the rotor 3.

The first lid member 11 and the second lid member 12 are fixed to the case section 10 by, for example, round-head screws or other screws.

As shown in FIGS. 1, 2 and 3, the rod attaching leg section 13 is a T-shaped member extending upwardly from the ease section 10. The rod attaching leg section 13 has a reel leg 13a extending longitudinally and formed at the tip of the rod attaching leg section 13. The reel leg 13a can be disposed on the reel seat of a fishing rod (not shown).

As shown in FIGS. 1 and 2, the body guard 14 includes the case section 10, the first lid member 11 and the second lid member 12 formed curving from the rear side to cover the side portions and the bottom portion. The body guard 14 is made of ABS resin or another relatively hard synthetic resin and has a surface plated with metal. The body guard 14 has a guard section 14a that covers the rear side the case section 10, the first lid member 11 and the second lid member 12, and a cylindrical shaped boss section 14b extending from the inner side surface of the guard section 14a towards the case section 10. The body guard 14 is fixed to the case section 10 by the threaded member 48a disposed on the rear wall of the case section 10 and the threaded member 48b installed at the lower surface of the guard section 14a.

The pressing plate 15 is arranged to hold at least a portion of the first guide shaft 23a, which is to be explained later, of the oscillating mechanism 6 to prevent the shaft from disconnecting; at the same time, the pressing place holds the bearing 43 that supports the rear end of the threaded shaft 21 to prevent the shaft from disconnecting. The pressing plate 15 is fixed to the rear side of the case section 10 by, for example, two threaded members 44.

The rotor driving mechanism 5 has a driving gear shaft 8 onto which the driving shaft 1a of the handle 1 is threaded and fixed, a driving gear 7 integrally formed with or separated from the driving gear shaft 8, and a pinion gear 9 engaged with the driving gear 7. In this embodiment, the driving gear 7 is integrally formed with the driving gear shaft.

As shown in FIG. 3, the driving gear 7 is a face gear made of, for example, an aluminum alloy, and is integrally formed with the driving gear shaft 8. As shown in FIG. 3, the gear section 7a formed from the face gear teeth bent to be engaged with the pinion gear 9 is arranged towards the right-hand side as seen from the rear side The driving gear shaft 8 is a solid member made of an aluminum alloy and is integrally formed with the driving gear 7. The driving gear shaft 8 is supported so as in be freely rotatable by the first boss section 11a and the second boss section 12a formed on the first lid member 11 and second lid member 12 of the reel body 2, respectively. More specifically, the shaft is rotatably installed on the reel body 2 by the first bearing 19a and the second bearing 19b disposed on the first boss section 11a and the second boss section 12a, respectively. The driving gear shaft 8 has a solid portion that is straddled by the first installing section 24a and the second installing section 24b of the slider body 24 to be explained later. The driving gear shaft 8 is formed with a diameter smaller than the other portions. The driving gear shaft 8 is arranged on the fishing rod side (the upper side) of the spool shaft 16. In the inner peripheral portions, at two ends of the driving gear shaft 8, the first female threaded portion 8a and the second female threaded portion 8b are formed, respectively. The first female threaded portion 8a and second female threaded portion 8b are threaded such that screws are fasten thereto when the handle 1 is rotated in the line rewinding direction. Thus, the first female threaded portion 8a on the left-hand side of FIG. 3 has left hand threads, while the second female threaded portion 8b on the right-hand side of FIG. 3 has right hand threads. Also, as shown in FIG. 2, on the inner side of the axial direction of the supporting section of the second bearing 19b of the driving gear shaft 8, a large diameter collar section 8c is formed in contact with the inner ring of the second bearing 19b. At two sites facing each other on the outer peripheral surface of the large diameter collar section 8c, notch portions 8d are formed as planar notches to facilitate the driving gear shaft 8 passing between the spool shaft 16 and the threaded shaft 21 during assembly.

The handle 1 can be positioned on either of the two ends of the driving gear shaft 8 as the left position arranged on the left-hand side of the reel body 2 and the right position arranged on the right-hand side of the reel body, respectively. However, as the first female threaded portion 8a and the second female threaded portion 8b have different thread directions, when the driving shaft 1a is attached on the left or right side, the corresponding type of the driving shaft should be prepared.

As shown in FIGS. 1 and 2, the pinion gear 9 is a hollow cylindrical member, and the front portion passes through the rotor 3 and is disposed so that the rotor 3 cannot rotate. As shown in FIG. 1, the spool shaft 16 is arranged through the inner peripheral portion of the pinion gear 9. A nut 17 is installed on the front portion of the pinion gear 9, and by means of the nut 17, the rotor 3 is connected to the pinion gear 9 so that they can rotate as an integrated body. The pinion gear 9 has an intermediate portion and a rear end portion in the axial direction supported by the bearing 18a and the bearing 18b at the intermediate portion and rear end portion in the axial direction, respectively, so as to be rotatably supported on the case section 10 of the reel body 2. The bearing 18a and bearing 18b are disposed on the mechanism supporting section 10b.

As shown in FIGS. 1, 2, 3 and 4, the oscillating mechanism 6 is a level winding mechanism of a traverse cam system. The oscillating mechanism 6 has a reduction gear mechanism 20 (FIG. 2) engaged with the pinion gear 9, a threaded shaft 21 rotating in conjunction with the reduction gear mechanism 20, a slider 22 that is engaged with the threaded shaft 21 and that reciprocally moves back and forth, and a first guide shaft 23a and a second guide shaft 23b that guide the slider 22 in the direction of the spool shaft 16. The oscillating mechanism 6 also has an annular first elastic member 45a and an annular second elastic member 45b arranged between the first guide shaft 23a and the first through-hole 10c and between the second guide shaft 23b and the second through-hole 10d, respectively. The first guide shaft 23a and the second guide shaft 23b are an example of the guide shafts. The first elastic member 45a and the second elastic member 45b are an example of the elastic members. The first elastic member 45a or the second elastic member 45b) are in contact with the large diameter section 10f of the first through-hole 10c (or the second through-hole 10d), the step section 10h, and the first guide shaft 23a (or the second guide shaft 23b), respectively.

As shown in FIGS. 1 and 2, the reduction gear mechanism 20 has a step gear 25 comprising a large diameter gear 25a and a small diameter gear 25b and is engaged with the pinion gear 9, and an intermediate gear 26 engaged with the small diameter gear 25 and installed on the shaft section of the front end portion of the threaded shaft 21 such that relative rotation is not possible. The large diameter gear 25a is a helical gear engaged with the pinion gear 9. The small diameter gear 25b is a helical gear engaged with the intermediate gear 26.

As shown in FIG. 1, the pinion gear 9 is arranged on the lower side of the driving gear shaft 8, and the step gear 25 and the intermediate gear 26 are arranged on the upper side of the driving gear shaft 8. The shaft portion of the front end of the threaded shaft 21 is formed with a diameter smaller than the remaining portion of the threaded shaft 21. Accordingly, this configuration ensures that the large diameter gear 25a and the shaft portion of the front end portion of the threaded shaft 21 do not significantly interfere with each other. The intermediate gear 26 is a helical gear that can be integrally rotated with the front end portion of the threaded shaft 21 in a freely rotatable way. Here, as the small diameter gear 25b is engaged with the large diameter intermediate gear 26, the rotation velocity of the pinion gear 9 is decreased significantly and is transmitted to the threaded shaft 21. With this reduction gear mechanism 20, decreasing the velocity of the reciprocating movement of the spool 4 is possible so that the fishing line can be tightly wound.

Figure 4:
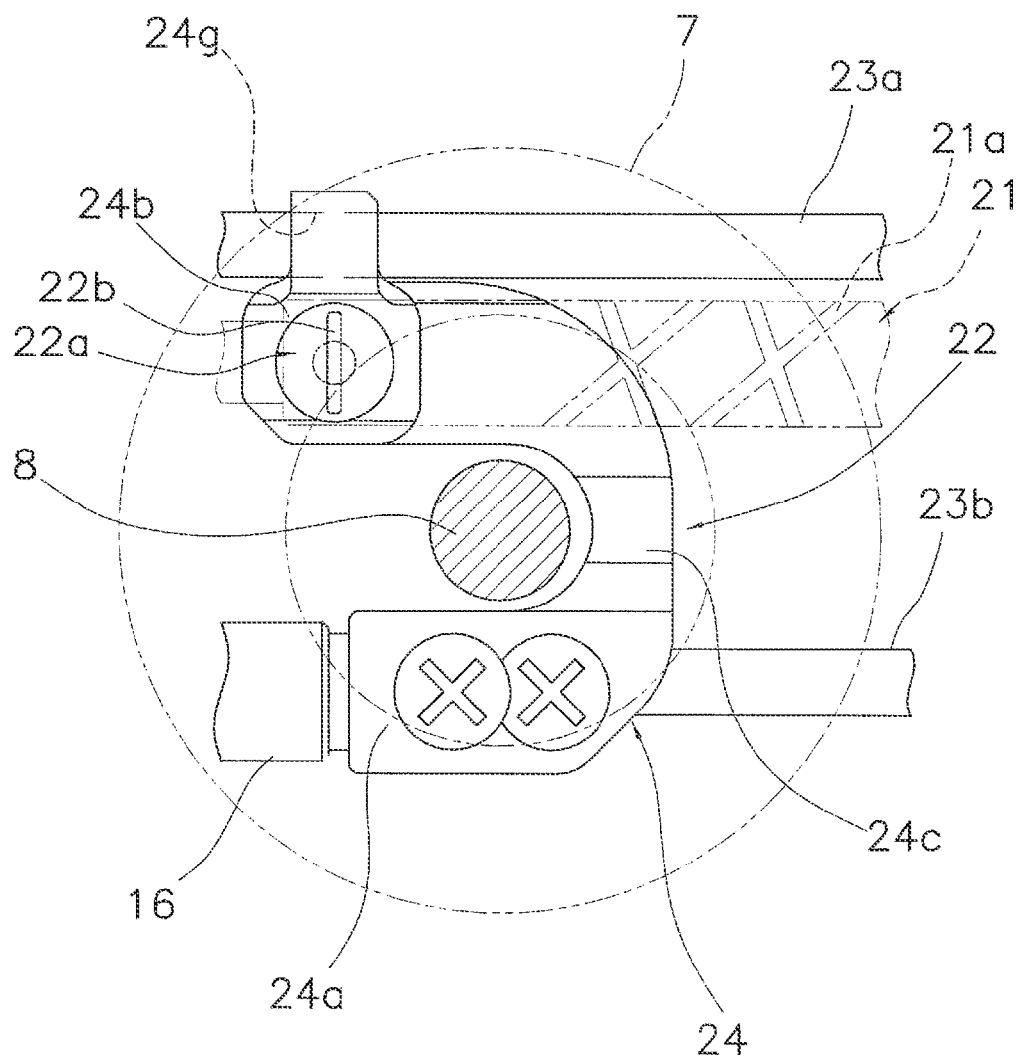
FIG. 4 is an enlarged cross-sectional view illustrating a slider of the spinning reel of FIG. 1.

As shown in FIGS. 1 and 2, the threaded shaft 21 is a member having a spiral-shaped groove 21a formed crossing on the surface, and this shaft is arranged parallel with the spool shaft 16. The threaded shaft 21 is supported at the two ends, that is, the rear end of the case section 10 and the mechanism supporting section 10b. More specifically, the threaded shaft is rotatably supported on the case section 10 via the bearing 42 installed on the mechanism supporting section 10b of the case section 10 and the bearing 43 installed on the rear end of the case section 10. The threaded shaft 21 is installed from the rear side of the case section 10. As shown in FIG. 4, which is an enlarged view, the threaded shaft 21 is arranged on the side (the upper side) of the reel leg 13a of the driving gear shaft 8 and almost parallel with the spool shaft 16. As shown in FIG. 3, the threaded shaft 21 is arranged facing the gear section 7a of the driving gear 7. The threaded shaft 21 is arranged at the position nearer to the side of the gear section 7a (the left-hand side in FIG. 3) than the spool shaft 16.

As shown in FIGS. 2, 3 and 4, the slider 22 has an engagement member 22a engaged with the spiral-shaped groove 21a of the threaded shaft 21 and the slider body 24 has the engagement member 22a disposed thereon so that the slider body 24 reciprocally moves back and forth in conjunction with the rotation of the threaded shaft 21. As the tip of the engagement member 22a is engaged with the spiral-shaped groove 21a, the slider 22 reciprocally moves in the spool axial direction corresponding to the rotation of the threaded shaft 21, and the spool shaft 16 reciprocally moves in conjunction with the rotation of the handle 1.

The engagement member 22a is disposed on the slider body 24 so as to rotate by a prescribed angle (for example, about 60° to 100°). The engagement member 22a has an engagement section 22b on the tip portion side and an installing shaft portion 22c with a diameter smaller than that of the engagement section 22b, This engagement section 22b is engaged with the spiral-shaped groove 21a on the threaded shaft 21, and the small diameter installing shaft portion 22c on the base end side is rotatably supported by the bush 22d disposed on the slider body 24. The base end portion of the engagement member 22a is locked to prevent a plate-shaped member 22e threaded on the slider body 24 from disconnecting. The engagement member 22a is inserted into the opening on the second lid member 12 side of the reel body 2. The engagement member 22a is assembled from the second lid member 12 installing side and in the order of the slider body 24 and the engagement member 22a.

As shown in FIGS. 2 and 4, the slider body 24 has a first installing section 24a that ensures the rear end portion of the spool shaft 16 is installed so that the shaft cannot rotate and cannot move in the axial direction, a second installing section 24b that ensures the engagement member 22a is installed via the bush 22d, and a connecting section 24c that connects the first installing section 24a and the second installing section 24b.

The first installing section 24a has a D-shaped connecting opening 24d that has the rear end portion of the spool shaft 16 integrally attached therein to be able to move in the axial direction and a second guide opening 24e guided by the second guide shaft 23b. The connecting opening 24d and the second guide opening 24e are arranged parallel with each other. The rear end portion of the spool shaft 16 is inserted in the connecting opening 24d and is fastened to the slider body 24 by two threaded members.

The second installing section 24b has an accommodating hole 24f where the engagement member 22a and the bush 22d are accommodated and where the first guide opening 24g is guided by the first guide shaft 23a. The accommodating hole 24f and the first guide opening 24g are arranged in offset directions. The engagement member 22a is accommodated in order to be able to rotate freely in the range defined in the accommodating hole 24f.

For the connecting section 24c, as shown in FIG. 4, when the spool 4 is positioned at the most forward site, the first installing section 24a and the second installing section 24b are curved and connected so that the first installing section 24a and the second installing section 24b are arranged on the upper/lower sides with the driving gear shaft 8 sandwiched therebetween. More specifically, the first installing section 24a as the fixed portion of the spool shaft 16 is arranged on the lower side as the side opposite to the fishing rod installing side of the driving gear shaft 8, while the second installing section 24b as the installing portion of the engagement member 22a is arranged on the upper side of the driving gear shaft 8.

The first installing section 24a and the second installing section 24b are arranged so that they are positioned ahead of the driving gear shaft 8 when the spool shaft 16 is positioned at the most forward position. The second installing section 24b is arranged ahead of the first installing section 24a. As shown in FIG. 3, the second installing section 24b is arranged to be deviated more toward the second lid member 12 side (right in FIG. 3) than the first installing section 24a. As shown in FIG. 4, the connecting section 24c is formed in a nearly U-shape along the outer peripheral portion of the cylindrical driving gear shaft 8. A As shown in detail in FIG. 3, the slider body 24 is arranged facing only the outer periphery on the side of the threaded shaft 21 away from the gear section 7a (the right-hand side in FIG. 3). Here, the threaded shaft 21 is arranged facing the gear section 7a of the driving gear 7, and the slider body 24 is arranged facing only the outer periphery of the side of the threaded shaft 21 away from the gear section 7a. As the threaded shaft 21 is arranged facing the slider body 24, the gear section 7a of the driving gear 7, the threaded shaft 21, the engagement member 22a and the slider body 24 are arranged sequentially to the right-hand side in FIG. 3.

As shown in FIGS. 1, 2 and 3, the first guide shaft 23a and the second guide shaft 23b are set through the first guide opening 24g and the second guide opening 24e of the slider body 24, respectively, and the slider 22 is guided along the spool shaft 16. The first guide shaft 23a and the second guide shaft 23b have two ends supported at the rear end of the case section 10 and the mechanism supporting section 10b. The first guide shaft 23a and the second guide shaft 23b are installed from the rear side of the case section 10. The first guide shaft 23a is arranged near the threaded shaft 21 in the direction approaching the reel leg 13a, that is, on the upper side shown in FIG. 3 of the engagement section 22b of the engagement member 22a. Also, the second guide shaft 23b is arranged in order to overlap the side of the spool shaft 16 away from the driving gear 7 on the second lid member 12 side rather than the first guide shaft 23a. As the first guide shaft 23a is arranged near the engagement section 22b, even when the slider body 24 is not supported by the threaded shaft 21, keeping a constant distance between the engagement section 22b and the spiral shaped groove 21a is still possible, and the engagement state of the engagement member 22a hardly varies. Also, as the second guide shaft 23b is arranged on the side of the spool shaft 16, the dead space on the side of the spool shaft 16 can be used efficiently; even when the second guide shaft 23b is arranged, there is still little influence on the left/right width of the reel body 2. In addition, there is little influence on the size of the reel body 2 in the up/down direction. In this embodiment, for the first guide shaft 23a arranged on the upper side, this shaft is partially held by the pressing plate 15 to prevent the shaft from disconnecting. The second guide shaft 23b arranged on the lower side is held by the head portion of the threaded member 46 screwed on the rear surface of the case section 10 to prevent the shaft from disconnecting.

Figure 6:
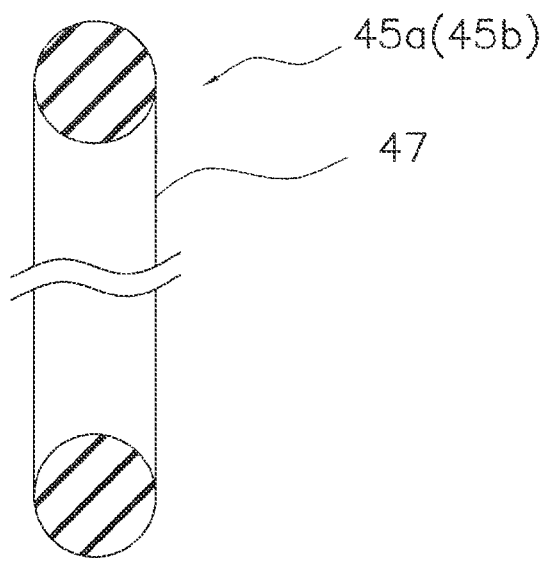
FIG. 6 is a cross-sectional view illustrating of the elastic member of the spinning reel of FIG. 1.

As shown in FIGS. 2 and 5, on the outer peripheral surfaces of the rear end side of the first guide shaft 23a and the second guide shaft 23b, the first annular groove 23c and the second annular groove 23d are an example of the annular grooves. The first elastic member 45a is disposed in the first annular groove 23c, and the second elastic member 45b is disposed in the second annular groove 23d. The first elastic member 45a and the second elastic member 45b are arranged to prevent the backlash of the first guide shaft 23a and the second guide shaft 23b in the axial direction. In addition, they are arranged to prevent dust and liquid or other foreign objects from entering the interior of the reel body 2. In this embodiment, as shown in FIG. 6, the first elastic member 45a and the second elastic member 45b are commercially available O-rings 47 with a round cross section. The first elastic member 45a (or the second elastic member 45b) is in contact with the large diameter section 10f and the step section 10h of the first through-hole 10c (or the second through-hole 10d) and the first guide shaft 23a (or the second guide shaft 23b), respectively.

As shown in FIG. 1, the rotor 3 has a rotor main body 35 rotatably mounted on the reel body 2 via the pinion gear 9, and a bale arm 34 mounted in a rocking manner on the rotor main body 35. The rotor main body 35 is made of, for example, an aluminum alloy, and has a cylindrical supporting section 30 fixed to the pinion gear 9, as welt as a first rotor arm 31 and a second rotor arm 32, which are set with an interval to the supporting section 30 from the position facing the outer peripheral surface of the rear end portion of the supporting section 30 and extending forward. The members that form the rotor main body 35, that is, the supporting section 30, the first rotor arm 31 and the second rotor arm 32, are made of for example, an aluminum alloy, and are integrally formed by die cast molding. As shown in FIG. 1, the outer peripheral sides in the radial direction of the first rotor arm 31 and the second rotor arm 32 cover the first cover member 36 and the second cover member 37. Also, on the outer peripheral sides of the tips of the first rotor arm 31 and the second rotor arm 32, the first bale supporting member 40 and the second bate supporting member 41 that form the bale arm 34 are installed in a free rocking way, respectively. The bale arm 34 is arranged so that the fishing line is guided to the spool 4 and so that the fishing line is wound up in the spool 4. The bale arm 34 can rock freely between the line guiding position and the line opening position as the position inverted from the line guiding position.

As shown in FIG. 1, the rotor 3 prohibits the reverse rotation opposite to the line releasing direction or lifts the prohibition by means of the reverse rotation prohibiting mechanism 50. The reverse rotation prohibiting mechanism 50 has a roller-type, one-way clutch 51 disposed on the mechanism supporting section 10b of the case section 10. The one-way clutch 51 also has a switch operation section 52 that switches the one-way clutch 51 between the reverse rotation prohibited state and the reverse rotation enabled state. The switch operation section 52 is supported in a free rocking way on the lower portion of the mechanism supporting section 10b of the case section 10.

As shown in FIG. 1, the spool 4 is, for example, a shallow groove made of an aluminum alloy and has a line winding barrel section 4a where the fishing line is wound on the outer periphery, a cylindrical skirt section 4b formed with a diameter larger than the line winding barrel section 4a at the rear end portion of the line winding barrel section 4a, and a front flange section 4c formed with a diameter a little larger than the line winding barrel section 4a at the tip portion of the line winding barrel section 4a. The line winding barrel section 4a has a thin cylindrical shape, and annular ribs 4d for reinforcement are formed on the inner peripheral surface at a plurality of sites separated from each other by an interval in the axial direction (for example, at two sites). Also, spool 4 has an attachment boss 4e that can be rotatably mounted on the spool shaft 16 at the center.

The spool 4 is fixed to the spool shaft 16 by a grip member 27 threaded to the tip of the spool shaft 16. While a mate section 16a is formed at the tip of the spool shaft 16, a chamfering section 16b longer than the male section 16a and parallel with mate section 16a is formed on the spool shaft 16. The grip member 27 has a nut member 27a made of a metal and threaded on the male section 16a of the spool shaft 16, and a grip main body 27b made of a synthetic resin integrally formed as the nut member 27a is inserted in a die. The grip body 27b has a boss section 27c with the nut member 27a arranged inside of the grip body, and the boss section 27c is formed extend around to the end time area (27d) of the nut member 27a. As a result, the contact surface between the nut member 27a and the boss section 27c is increased, and relaxation of the nut member 27a with respect to the boss section 27c is possible.

In the spinning reel 100 with the previously mentioned configuration, casting is carried out while the bale arm 34 is in the line opening position. After casting, the handle 1 is rotated in the line wind-up direction, and the bale arm 34 is inverted to the line wind-up position by a bale inverting mechanism (not shown). As the handle 1 is rotated, the rotor 3 rotates in the line wind-up direction and is wound up in the spool 4. While the rotor 3 rotates, the oscillating mechanism 6 works so that the slider 22 reciprocally moves back and forth and so that the spool 4 reciprocally moves back and forth via the spool shaft 16.

In this configuration, if there is a gap between the pressing plate 15 and the first guide shaft 23a or between the head portion of the threaded member 46 and the second guide shaft 23b, due to the friction of the first guide shaft 23a and the second guide shaft 23b with the slider 22, backlash takes place in the longitudinal direction. However, according to the present embodiment, the first elastic member 45a and the second elastic member 45b are arranged in the gap with the case section 10, so that movement in the longitudinal direction (the axial direction) of the first guide shaft 23a and the second guide shaft 23*b* is limited. Also, the first guide shaft 23*a* and the second elastic member 45*b* prevent contact between the first guide shaft 23*a* and the first through-hole 10*c* and between the second guide shaft 23*b* and the second through-hole 10*d*. Here, the arrangement of the annular first elastic member 45*a* and second elastic member 45*b* between the first guide shaft 23*a* and the first through-hole 10*c* and between the second guide shaft 23*b* and the second through-hole 10*d*, respectively, limits the movement of the first guide shaft 23*a* and second guide shaft 23*b* in the axial direction and in the radial direction. Accordingly, the backlash of the first guide shaft 23*a* and the second guide shaft 23*b* in the axial direction is suppressed, and noise caused by the backlash in the axial direction is prevented.

In addition, the arrangement of the annular first elastic member 45*a* and second elastic member 45*b* between the first guide shaft 23*a* and the first through-hole 10*c* and between the second guide shaft 23*b* and the second through-hole 10*d* seals off the gap between the first guide shaft 23*a* and the first through-hole 10*c* and between the second guide shaft 23*b* and the second through-hole 10*d*, preventing dust, liquid or other foreign Objects from entering the interior of the reel body 2 of the spinning reel 100.

<Other Embodiments>

Above, an embodiment of the present invention has been explained. However, the present invention is not limited to the previously mentioned embodiment. Various changes can be made as long as the spirit of the present invention is observed. In particular, as needed, the plural embodiments and modified examples presented in this specification may be combined at will.

(a) In the previously mentioned embodiment, a spinning reel for casting is explained as an example. However, the present invention is not limited to this scheme. As long as the spirit of the invention is observed, various changes can be made. The present invention can be adopted on all spinning reels, such as the front drag type, the rear drag type, the lever brake type, etc, having a traverse cam type oscillating mechanism with a guide shaft.

Figure 7:
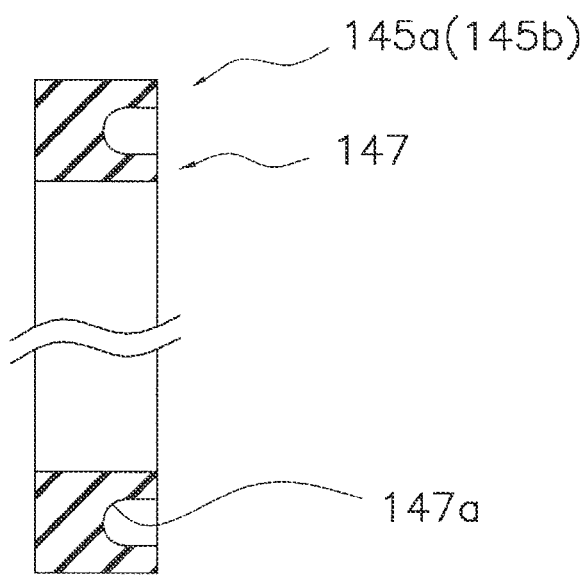
FIG. 7 is a diagram of another embodiment of the elastic member corresponding to FIG. 6.

(b) In the previously mentioned embodiment, the commercially available O-rings 47 are used as the first elastic member 45*a* and the second elastic member 45*b*. However, the present invention is not limited to this configuration. For example, as shown in FIG. 7, O-rings 147 with a rectangular outer shape and a nearly C-shaped cross section and having an annular recession 147*a* with a U-shaped cross section may also be adopted as the first elastic member 145*a* and the second elastic member 145*b*, In this case, the annular recession 147*a* is preferably arranged towards the rear side.

(c) In the previously mentioned embodiment, the driving gear shaft 8 is a solid member. However, a hollow cylindrical member can also be adopted. One may also adopt a configuration in which the driving gear shaft 8 is made to be lighter by forming a plurality of through-holes on the shaft.

(d) In the previously mentioned embodiment, the first elastic member 45*a* and the second elastic member 45*b* are disposed on the first guide shaft 23*a* and second guide shaft 23*b*, respectively. However, the present invention is not limited to this configuration. The first elastic member and the second elastic member may also be disposed in the first through-hole 10*c* and the second through-hole 10*d*, respectively. In this case, the annular grooves should be preferably formed on the first through-hole 10*c* and the second through-hole 10*d*.

(e) In the previously mentioned embodiment, two guide shafts, that is, the first guide shaft 23*a* and the second guide shaft 23*b*, are arranged. However, there may be at least one guide shaft. When the slider is guided by one guide shaft, a threaded shaft passes through the slider, and the slider is guided by the threaded shaft and the guide shaft. One may also adopt a configuration in which a rail extending in the longitudinal direction is formed in the reel body, and the slider is guided by the rail and the guide shaft. When there is one guide shaft, one elastic member may be used.

(f) In the previously mentioned embodiment, the first guide shaft 23*a* and the second guide shaft 23*b* are arranged with a distance larger than the conventional spinning reel, and only the first guide shaft 23*a* and the bearing 43 are held on the pressing plate 15. However, the present invention is not limited to this configuration. One may also adopt a configuration in which the pressing plate holds two guide shafts and the bearing 43 to prevent, the shaft from disconnecting.

<Characteristic Features>

The previously mentioned embodiments may be expressed as follows.

(A) The spinning reel 100 is a reel that can forwardly release a fishing line. The spinning reel 100 has a reel body 2, a spool shaft 16, a spool 4, a rotor 3, a rotor driving mechanism 5, and an oscillating mechanism 6. The reel body 2 has a handle 1 for winding the fishing line rotatably disposed in the reel body. The spool shaft 16 is mounted in the reel body 2 so as to be able to reciprocally move back and forth. The spool 4 is arranged in the front end portion of the spool shaft 16 and has the fishing line wound on the outer periphery thereof. The rotor 3 is rotatably arranged on the outer peripheral side of the spool 4. As the handle 1 is rotated, the fishing line is wound on the spool 4. The rotor driving mechanism 5 transfers the rotation of the handle 1 to the rotor 3 and it rotates the rotor 3 in conjunction with the rotation of the handle 1. The oscillating mechanism 6 rotates in conjunction with the handle 1 to drive the spool 4 so that the spool reciprocally moves back and forth via the spool shaft 16. The oscillating mechanism 6 has a threaded shaft 21, a slider 22, a first guide shaft 23*a*, a second guide shaft 23*b*, an annular first elastic member 45*a* and an annular second elastic member 45*b*. The threaded shaft 21 has spiral groove 21*a* formed on the outer peripheral portion and rotates in conjunction with the rotation of the handle 1. The slider 22 is connected to the spool shaft 16 so that they can move as a unit in the axial direction. The slider 22 is engaged with the spiral-shaped groove 21*a* of the threaded shaft 21 and it reciprocally moves back and forth in conjunction with the rotation of the threaded shaft 21. The first guide shaft 23*a* and the second guide shaft 23*b* have at least their rear ends supported in the first through-hole 10*c* and the second through-hole 10*d*, respectively, and the guide shafts guide the reciprocating movement of the slider 22. The annular first elastic member 45*a* and the second elastic member 45*b* are arranged between the first through-hole 10*c* and the first guide shaft 23*a* and between the second through-hole 10*d* and the second guide shaft 23*b*, respectively.

In the spinning reel 100, as the handle 1 is rotated, the threaded shaft 21 is rotated, the slider 22 is driven to reciprocally move back and forth, and the spool 4 is driven to reciprocally move back and forth. The slider 22 is guided in the first guide shaft 23*a* and the second guide shaft 23*b* in the longitudinal direction. The first guide shaft 23*a* and the second guide shaft 23*b* are mounted in the reel body 2 through the first through-hole 10*c* and the second through-hole 10*d*, respectively, and their rear ends are supported by the reel body 2. After the first guide shaft 23*a* and second guide shaft 23*b* are mounted in the reel body 2, they are locked by the reel body 2 to prevent the shaft from disconnecting. The annular first elastic member 45*a* and second elastic member 45*b* are arranged between the first through-hole 10*c* and the second through-hole 10d and between the first guide shaft 23a and the second guide shaft 23b, respectively, The annular first elastic member 45a and second elastic member 45b limit the movement in the longitudinal direction (the axial direction) of the first guide shaft 23a and the second guide shaft 23b. Also, the annular first elastic member 45a and second elastic member 45b can prevent contact between the first guide shaft 23a and the second guide shaft 23b and between the first through-hole 10c and the second through-hole 10d, respectively.

Here, the first elastic member 45a and the second elastic member 45b are arranged between the first guide shaft 23a and the second guide shaft 23b and between the first through-hole 10c and the second through-hole 10d, respectively, so as to limit the movement of the first guide shaft 23a and second guide shaft 23b in the axial direction and radial direction. Consequently, the backlash of the first guide shaft 23a and the second guide shaft 23b in the axial direction is suppressed, and noise caused by the backlash in the axial direction is prevented. In addition, Arrangement of the first elastic member 45a and the second elastic member 45b between the first through-hole 10c and the second through-hole 10d and between the first guide shaft 23a and the second guide shaft 23b, respectively, seals off the gaps between the first through-hole 10c and the second through-hole 10d and between the first guide shaft 23a and the second guide shaft 23b, respectively. Consequently, dust, liquid or other foreign objects are prevented from entering the gaps between the first through-hole 10c and the second through-hole 10d and between he first guide shaft 23a and the second guide shaft 23b is possible.

(B) The first guide shaft 23a and the second guide shaft 23b may also have the first annular groove 23c and the second annular groove 23d that hold the first elastic member 45a and the second elastic member 45b on the outer peripheral surfaces. In this case, since the first elastic member 45a and the second elastic member 45b are held in the first annular groove 23c and the second annular groove 23d, respectively, moving the first guide shaft 23a and second guide shaft 23b the axial direction is even more difficult.

(C) The first elastic member 45a and second elastic member 45b may be rubber O-rings 47. In this configuration, using commercially available O-rings 47 with a round-shaped cross section or O-rings 147 that do not have a round-shaped cross section simplifies the prevention of noise.

(D) The first elastic member 145a and the second elastic member 145b may also be O-rings 147 having a cross section with an annular recession 147a on the rear side. This configuration results in a lighter first elastic member 45a and second elastic member 145b, while at the same time, more reliably preventing the entry of foreign objects, since the annular recession 147a is arranged on the rear side.

(E) The first through-hole 10c and the second through-hole 10d each have a large diameter section 10f, a small diameter section 10g, and a step section 10h that connects the large diameter section 10f and the small diameter section 10g, and the first elastic member 45a (or the second elastic member 45b) may also be set between the large diameter section 10f and the first guide shaft 23a (or the second guide shaft 23b). In this configuration, in the small diameter section 10g, since the gap in the radial direction between the first guide shaft 23a (or the second guide shaft 23b) and the small diameter section 10g of the first through-hole 10c (or the second through-hole 10d) is small, backlash of the first guide shaft 23a (or the second guide shaft 23b) in the radial direction is minimized.

(F) The first elastic member 45a (or the second elastic member 45b) may be in contact with the large diameter section 10f, the step section 10h, and the first guide shaft 23a (or the second guide shaft 23b). In this configuration, since the first elastic member 45a (or the second elastic member 45b) is in contact with the step section 10h, the first guide shaft 23a (or the second guide shaft 23b) can be positioned in the axial direction, and the backlash of the first guide shaft 23a (or the second guide shaft 23b) in the axial direction can be suppressed. Also, dust, liquid or other foreign objects are prevented from entering the spinning reel 100 through the gap between the first through-hole 10c (or the second through-hole 10d) and the first guide shaft 23a (or the second guide shaft 23b).

(G) The reel body 2 may have a pressing plate 15 that holds at least a portion of the rear end section of the first guide shaft 23a. In this configuration, while the pressing plate 15 prevents the first guide shaft 23a from disconnecting, it is still difficult for the first guide shaft 23a to come into contact with the pressing plate 15, and the generation of noise is prevented although the pressing plate 15 is arranged on the reel body.

(H) The reel body 2 may also have the body guard 14 that covers the rear end portions of the first guide shaft 23a and the second guide shah 23b as well as the pressing plate 15. In this configuration, since the body guard 14 covers the pressing plate 15 and the rear end portions of the first guide shaft 23a and second guide shaft 23b, the appearance of the spinning reel 100 is improved.

What is clamed is:

1. A spinning reel for forwardly releasing a fishing line, comprising:
    a reel body having a through-hole disposed in a rear portion thereof;
    a handle rotatably mounted to the reel body and configured to rotate so as to wind the fishing line;
    a spool shaft having a front end portion, being disposed on the reel body, and being configured to move in a longitudinal direction of the reel body;
    a spool disposed on the front end portion of the spool shaft, and being configured to have the fishing line wound on an outer periphery thereof;
    a rotor disposed on an outer peripheral side of the spool;
    a rotor driving mechanism configured to transfer rotation of the handle to the rotor and rotate the rotor in conjunction with the rotation of the handle; and
    an oscillating mechanism configured to rotate in conjunction with the handle and cause the spool to reciprocally move back and forth via the spool shaft,
    the oscillating mechanism comprising
    a threaded shaft having a spiral groove crossing an outer peripheral portion thereof and being configured to rotate in conjunction with the rotation of the handle,
    a slider connected to the spool shaft so as to enable the slider and the spool shaft to move as a unit in the axial direction, being engaged with the spiral groove of the threaded shaft, and being configured to reciprocate in conjunction with rotation of the threaded shaft,
    a guide shaft having a rear end disposed in the through-hole arranged in the rear portion of the reel body, and being locked so as to prevent the shaft from disconnecting from by the reel body, and being configured to guide the reciprocation of the slider, and
    an annular elastic member disposed in between the through-hole and the guide shaft.

2. The spinning reel according to claim 1, wherein the guide shaft has a holding groove that holds the elastic member on the outer peripheral surface.

3. The spinning reel according to claim 1, wherein the elastic member is a rubber O-ring.

4. The spinning reel according to claim 3, wherein the O-ring has a substantially C-shaped cross section with an annular recession on a rear portion side.

5. A spinning reel for forwardly releasing a fishing line, comprising:
- a reel body having a through-hole disposed in a rear portion thereof, the through-hole having a large diameter section, a small diameter section, and a step section that connects the large diameter section and the small diameter section;
- a handle rotatably mounted to the reel body and configured to rotate so as to wind the fishing line;
- a spool shaft having a front end portion, being disposed on the reel body, and being configured to move in a longitudinal direction of the reel body;
- a spool disposed on the front end portion of the spool shaft, and being configured to have the fishing line wound on an outer periphery thereof;
- a rotor disposed on an outer peripheral side of the spool;
- a rotor driving mechanism configured to transfer rotation of the handle to the rotor and rotate the rotor in conjunction with the rotation of the handle; and
- an oscillating mechanism configured to rotate in conjunction with the handle and cause the spool to reciprocally move back and forth via the spool shaft,
- the oscillating mechanism comprising
- a threaded shaft having a spiral groove crossing an outer peripheral portion thereof and being configured to rotate in conjunction with the rotation of the handle,
- a slider connected to the spool shaft so as to enable the slider and the spool shaft to move as a unit in the axial direction being engaged with the spiral groove of the threaded shaft, and being configured to reciprocate in conjunction with rotation of the threaded shaft,
- a guide shaft having a rear end disposed in the through-hole arranged in the rear portion of the reel body and being locked so as to prevent the shaft from disconnecting from by the reel body, and being configured to guide the reciprocation of the slider, and
- an annular elastic member disposed in between the through-hole and the guide shaft,
- the elastic member being disposed between the large diameter section and the guide shaft.

6. The spinning reel according to claim 5, wherein the elastic member contacts the large diameter section, the step section and the guide shaft.

7. A spinning reel for forwardly releasing a fishing line, comprising:
- a reel body having a through-hole disposed in a rear portion thereof;
- a handle rotatably mounted to the reel body and configured to rotate so as to wind the fishing line;
- a spool shaft having a front end portion, being disposed on the reel body, and being configured to move in a longitudinal direction of the reel body;
- a spool disposed on the front end portion of the spool shaft, and being configured to have the fishing line wound on an outer periphery thereof;
- a rotor disposed on an outer peripheral side of the spool;
- a rotor driving mechanism configured to transfer rotation of the handle to the rotor and rotate the rotor in conjunction with the rotation of the handle; and
- an oscillating mechanism configured to rotate in conjunction with the handle and cause the spool to reciprocally move back and forth via the spool shaft,
- the oscillating mechanism comprising
- a threaded shaft having a spiral groove crossing an outer peripheral portion thereof and being configured to rotate in conjunction with the rotation of the handle,
- a slider connected to the spool shaft so as to enable the slider and the spool shaft to move as a unit in the axial direction, being engaged with the spiral groove of the threaded shaft, and being configured to reciprocate in conjunction with rotation of the threaded shaft,
- a guide shaft having a rear end disposed in the through-hole arranged in the rear portion of the reel body and being locked as to prevent the shaft from disconnect from by the reel body, and being configured to guide the reciprocation of the slider, and
- an annular elastic member disposed in between the through-hole and the guide shaft,
- the reel body having a pressing plate holding at least a portion of a rear end portion of the guide shaft.

8. The spinning reel according to claim 7, wherein the reel body includes a main body cover covering the rear end portion of the guide shaft and the pressing plate.

* * * * *